United States Patent [19]

Izumi

[11] Patent Number: 4,761,830
[45] Date of Patent: Aug. 2, 1988

[54] COMMUNICATION DEVICE

[75] Inventor: Sachihiro Izumi, Kakuda, Japan

[73] Assignee: Alps Electric Co., Ltd., Japan

[21] Appl. No.: 20,435

[22] Filed: Mar. 2, 1987

[30] Foreign Application Priority Data

Jul. 23, 1986 [JP] Japan .................................. 61-173481

[51] Int. Cl.⁴ ............................................... H04B 1/16
[52] U.S. Cl. ..................................... 455/343; 455/345
[58] Field of Search ................. 455/343, 345, 352, 39, 455/117, 127

[56] References Cited

U.S. PATENT DOCUMENTS

| | | | |
|---|---|---|---|
| 4,523,332 | 6/1985 | Mori | 455/343 |
| 4,531,237 | 7/1985 | Bar-on et al. | 455/343 |
| 4,559,492 | 12/1985 | Baba et al. | 324/83 D |
| 4,595,972 | 6/1986 | Davis et al. | 455/343 |
| 4,652,875 | 3/1987 | Waki | 455/343 |
| 4,691,382 | 9/1987 | Nakajima | 455/343 |

FOREIGN PATENT DOCUMENTS

| | | | |
|---|---|---|---|
| 0057003 | 8/1982 | European Pat. Off. | 455/343 |
| 0095750 | 12/1983 | European Pat. Off. | 455/343 |
| 0103238 | 6/1983 | Japan | 455/343 |

Primary Examiner—Michael A. Masinick
Assistant Examiner—Curtis A. Kuntz
Attorney, Agent, or Firm—Guy W. Shoup; Leighton K. Chong

[57] ABSTRACT

A communication device wherein leader pulses which continue for a predetermined time period are transmitted prior to the transmission of data from its transmitter; its receiver is rendered intermittently operative at a cycle shorter than half the continuation time of said leader pulses by means of a cycle operation controlling means to thereby become operative for a short time at a duty lower than 1/10; while the receiver is operating, it is detected by a detector means whether or not the leader pulses are transmitted; and when the transmission of the leader pulses is detected by the detector means, the receiver is kept operative for a predetermined time period by an operation holder means.

1 Claim, 1 Drawing Sheet

COMMUNICATION DEVICE

BACKGROUND OF THE INVENTION (a) Field of the Invention

The present invention relates to a communication device capable of reducing the current consumption of its receiver which is held ready for reception.

(b) Prior Art

The ratio control device has been used to remotely lock and unlock the doors and trunks of motor vehicles or cars. In the case of this radio control device, its transmitter is carried by the driver while its receiver is set in the car. Responsive to data transmitted from the transmitter, the receiver renders an actuator operative to remotely lock and unlock the doors and trunks of cars.

In the case of this conventional radio control device, however, the receiver must be usually kept ready for receiving data because it is uncertain when the data is transmitted from the transmitter while the driver who carries the transmitter leaves his car. In addition, the receiver uses the battery for the car as its power source. The current of the car battery is therefore likely to be consumed by the receiver which must be kept ready for receiving data for a long time. It is thus desired to reduce the current consumption of the receiver which is left ready for data reception.

SUMMARY OF THE INVENTION

The present invention is therefore intended to eliminate the above-mentioned drawback of the conventional radio control device and the object of the present invention is to provide a communication device capable of reducing the current consumption of its receiver in such a way that the receiver is made intermittently operative at low duty to make its operation time shorter.

This object of the present invention can be achieved by a communication device wherein leader pulses which continue for a predetermined time period are transmitted prior to the transmission of data from its transmitter; its receiver is rendered intermittently operative at a cycle shorter than half the continuation time of said leader pulses by means of a cyclic operation controlling means to thereby become operative for a short time at a duty lower than 1/10; while the receiver is operating, it is detected by a detector means whether or not the leader pulses are transmitted; and when the transmission of the leader pulses is detected by the detector means, the receiver is kept operative for a predetermined time period by an operation holder means.

The receiver is made intermittently operative at a duty lower than 1/10 by means of the cyclic operation controlling means and when leader pulses are detected during this operation period of the receiver by the detector means prior to the transmission of data, the receiver is rendered operative for a predetermined time period by the operation holder means. The operating time of the receiver which is waiting for being made operative can be thus made shorter than 1/10 of its waiting time and its current consumption can be made lower than 1/10, as compared with the conventional devices of this type. In addition, the intermittent operation of the receiver is made at a cycle shorter than half the continuation time of the leader pulse. The receiver can be thus made operative two or more times while the leader pulse is being transmitted, thereby enabling the leader pulse to be reliably detected. The receiver can be held operative for the predetermined time due to this detection of the leader pulse to achieve same data reception as attained by the conventional devices.

DETAILED DESCRIPTION OF THE PREFERRED EMBODIMENT

Figure 1:
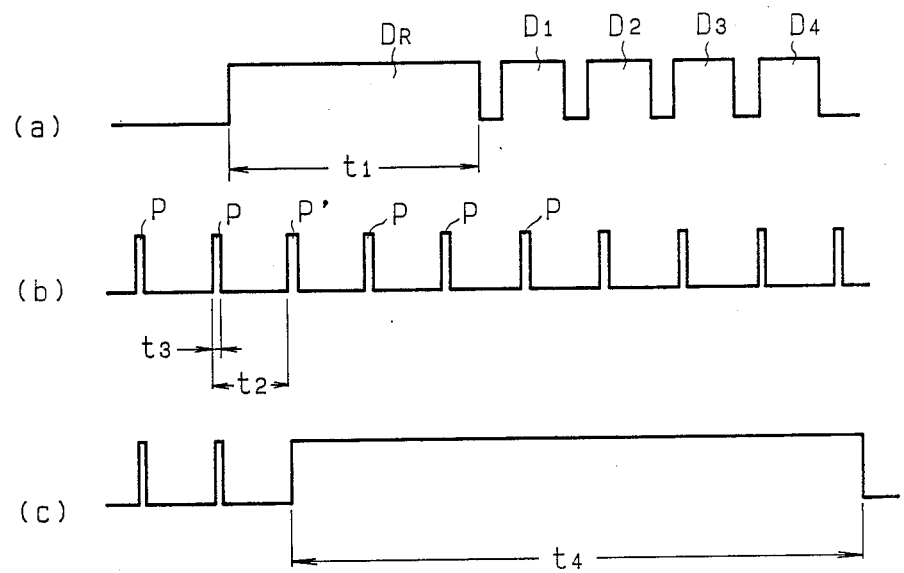
FIGS. 1(a)–(c) are time charts for explaining the operation of a communication device embodied according to the present invention.
Figure 2:
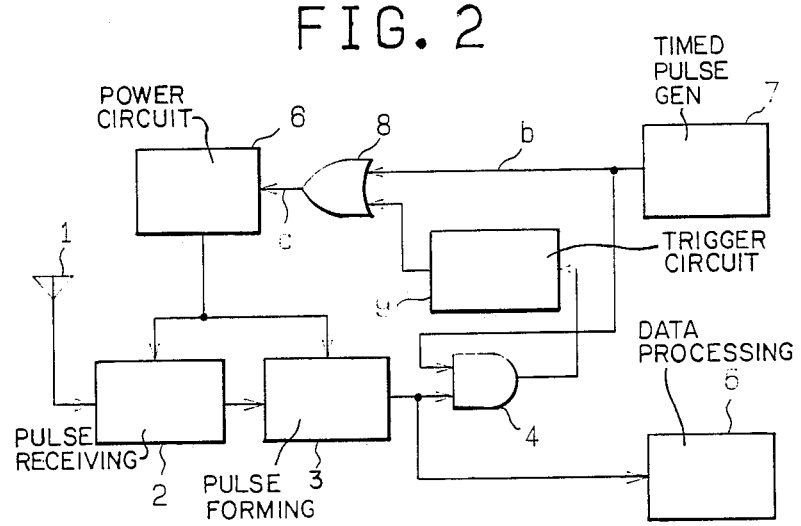
FIG. 2 is a block diagram showing an example of the receiver employed by the communication device of the present invention.

An embodiment of the present invention will be described with reference to FIGS. 1 and 2. FIG. 1(a) designates the data signal transmitted from the transmitter, i.e. input pulse waveform at antenna 1, FIG. 1(b) denotes an output waveform of the intermittent pulse generator circuit 7, and FIG. 1(c) indicates an output waveform of the multi-vibrator 9 through OR circuit 8 of the receiver of FIG. 2, which is configured to respond to the input pulse waveform according to the timing functions described herein.

As shown in FIG. 1(a), a leader pulse $D_R$ is transmitted from a transmitter prior to data $D_1$–$D_4$. This leader pulse $D_R$ has a predetermined continuation time $t_1$ longer than that of each of the data $D_1$–$D_4$ transmitted. The data $D_1$–$D_4$ each having same contents are repeatedly transmitted so that reliable reception can be achieved by a receiver. In the case of the receiver shown in FIG. 2, the antenna input of an antenna 1 is tuned and selected by a receiving circuit 2 and applied to a pulse forming circuit 3, whose output is applied to an input terminal of an AND circuit 4 and to a data processing circuit 5. Operating voltage is supplied from a power source circuit 6 to the receiving and pulse forming circuits 2 and 3. The receiver is further provided with an intermittent pulse generator circuit 7, which is caused to output pulses P at a cycle $t_2$ shorter than half the predetermined continuation time $t_1$ of the leader pulse $D_R$, as shown in FIG. 1(b), each of said pulses P having a pulse width $t_3$ smaller than 1/10 of the cycle $t_2$. The pulses P are applied to another input terminal of the AND circuit 4 and an input terminal of an OR circuit 8. The output of the AND circuit 4 is applied to the trigger input terminal of a multi-vibrator 9 which outputs an output pulse having a predetermined continuation time $t_4$ long enough to receive the data $D_1$–$D_4$. Output pulses of this multi-vibrator 9 are applied to another input terminal of the OR circuit 8. Responsive to the output of the OR circuit 8, the power source circuit 6 intermittently supplies operating voltage to the receiving and pulse forming circuits 2 and 3. The power source circuit 6 uses the car battery, for example, as its power source. The continuation time $t_1$ of the leader pulse $D_R$ is 100 ms, the cycle $t_2$ at which the receiver is intermittently made operative is 32 ms, the pulse width $t_3$ 2 ms, and the predetermined continuation time $t_4$ 2.6 s. These numerals are cited as an example.

The receiver composed as described above is rendered operative when the pulses P are applied from the intermittent pulse generator 7 to the power source circuit 6 through the OR circuit 8 and when operating voltage is supplied from the power source circuit 6 to the receiving and pulse forming circuits 2 and 3 only for the time period $t_3$ during which one pulse P is being outputted. The receiver is left inoperative while no pulse P is being outputted. Since the pulse width $t_3$ of each of the pulses P is smaller than 1/10 of the cycle $t_2$ at which the receiver is intermittently made operative, therefore, the receiver can be operated at a duty lower than 1/10. When the leader pulse $D_R$ and data $D_1$–$D_4$ are transmitted from the transmitter, as shown in FIG. 1(a), to the receiver which is waiting for being intermittently rendered operative for a short time at the cycle $t_2$ shorter than the continuation time $t_1$ of the leader pulse $D_R$, the leader pulse $D_R$ is received by the receiving circuit 2 which has been made operative by the pulse P' which is firstly outputted during the transmission of the leader pulse $D_R$, and it is further applied to the one input terminal of the AND circuit 4 through the pulse forming circuit 3. Since the pulse P' is applied to the other input terminal of the AND circuit 4 at this time, the AND circuit 4 is outputted to trigger the multivibrator 9. The cycle $t_2$ at which the receiver is intermittently made operative is shorter than half the continuation time $t_1$ of the leader pulse $D_R$ and two or more pulses P are outputted while the leader pulse $D_R$ is being transmitted, thereby enabling the leader pulse $D_R$ to be reliably detected. The output pulses of the multivibrator 9 are applied to the power source circuit 6 through the OR circuit 8, as shown in FIG. 1(c), and the power source circuit 6 continuously supplies operating voltage to the receiving and pulse forming circuits 2 and 3 only for the predetermined time period $t_4$. The data $D_1$–$D_4$ are appropriately processed by the data processing circuit 5 due to this continuous operation of the receiver, so that car doors and trunks can be locked and unlocked depending upon data contents.

Although the intermittent pulse generator circuit 7 has been used as the cyclic operation control means, the AND circuit 4 as the detector means, and the multivibrator 9 as the operation holder means in the case of the above-described embodiment, the present invention is not limited to them but any circuits having same functions as described above can be used whatever they may be constructed. The cyclic operation control means, for example, may consist of the combination of a vibrator and a counter circuit.

Although the communication device of the present invention has been used as the radio control device for remotely locking and unlocking car doors and trunks, it is not limited to this but it may be used as the transceiver, emergency communication device or the like in which the receiver is usually made ready for data reception.

According to the communication device of the present invention as described above, the receiver is intermittently made operative for a short time at a duty lower than 1/10. The operation time of the receiver which is waiting for being rendered operative can be thus made shorter than 1/10 of its waiting time, and its current consumption can be made lower than 1/10, as compared with the conventional devices of this type. In addition, the cycle at which the receiver is intermittently rendered operative is made shorter than half the continuation time of the leader pulse which is transmitted from the transmitter prior to the data. The receiver can be thus made operative two or more times during the transmission of the leader pulse, thereby enabling the leader pulse to be reliably detected.

I claim:

1. A communication device operated between a transmitter of a data signal and a receiver connectable to a power source, comprising:

the transmitter transmitting a data signal consisting of a leader pulse which is continuous for a predetermined time period $t_1$ followed by a series of data pulses provided within a predetermined duration;

the receiver having receiving means for receiving the data signal from the transmitter, an intermittent pulse generator for generating a series of timed pulses spaced apart by a time period $t_2$ and having a duty cycle of $t_3$, an AND circuit having the data signal from the receiving means applied to one terminal and the timed pulses from the intermittent pulse generator applied to its other terminal and outputting a high level pulse when a timed pulse coincides with a leader pulse of the data signal, a trigger circuit for outputting an output pulse which is continuous for a time period $t_4$ in response to receiving the high level pulse from the AND circuit, an OR circuit having the output pulse from said trigger circuit applied to one terminal and the timed pulses from the intermittent pulse generator applied to its other terminal and outputting a high level output when either of said timed pulses or said continuous output pulse is present, a power source circuit responsive to the high level output from said OR circuit for connecting power from the power source to said receiving means, and a data processing circuit for processing the data pulses of the data signal when said receiving means is connected by said power source circuit to an operating voltage of the power source when the continuous output pulse of time period $t_4$ is provided by said trigger circuit, wherein $t_2 < \frac{1}{2} \times t_1$, $t_3 < 1/10\ t_2$, $t_4$ is long enough to receive all data pulses after detection of the leader pulse $t_1$, whereby when no data signal is transmitted, the power source is connected to the receiver less than 1/10 the time over the timed pulses, and since $t_2$ is shorter than $\frac{1}{2}$ the time period of the leader pulse, two or more timed pulses are generated during a leader pulse to ensure that the leader pulse will be reliably detected.

* * * * *